United States Patent
Schaer

(10) Patent No.: US 10,688,614 B2
(45) Date of Patent: Jun. 23, 2020

(54) PORTABLE POWER TOOL

(71) Applicant: Hilti Aktiengesellschaft, Schaan (LI)

(72) Inventor: Roland Schaer, Grabs (CH)

(73) Assignee: HILTI AKTIENGESELLSCHAFT, Schaan (LI)

(*) Notice: Subject to any disclaimer, the term of this patent is extended or adjusted under 35 U.S.C. 154(b) by 163 days.

(21) Appl. No.: 16/070,565

(22) PCT Filed: Jan. 24, 2017

(86) PCT No.: PCT/EP2017/051364
§ 371 (c)(1),
(2) Date: Jul. 17, 2018

(87) PCT Pub. No.: WO2017/129538
PCT Pub. Date: Aug. 3, 2017

(65) Prior Publication Data
US 2019/0061081 A1    Feb. 28, 2019

(30) Foreign Application Priority Data

Jan. 29, 2016 (EP) ..................... 16153432

(51) Int. Cl.
*B23Q 11/00* (2006.01)
*B25D 16/00* (2006.01)
(Continued)

(52) U.S. Cl.
CPC ...... *B23Q 11/0085* (2013.01); *B23Q 11/0092* (2013.01); *B23Q 11/04* (2013.01);
(Continued)

(58) Field of Classification Search
CPC . B23Q 11/0085; B23Q 11/0092; B23Q 11/04; B25D 16/00; B25D 16/003;
(Continued)

(56) References Cited

U.S. PATENT DOCUMENTS 4,066,133 A * 1/1978 Voss ............... B25B 23/147
                                                173/182
4,267,914 A * 5/1981 Saar ............... B23Q 11/04
                                                192/147
(Continued)

FOREIGN PATENT DOCUMENTS

| EP | 0666148 A1 | 8/1995 |
| EP | 0771619 A2 | 5/1997 |
| EP | 1201373 A2 | 5/2002 |

OTHER PUBLICATIONS

International Bureau, International Search Report in International Application No. PCT/EP2017/051364, dated Mar. 23, 2017.

*Primary Examiner* — Robert F Long
(74) *Attorney, Agent, or Firm* — Leydig Voit & Mayer, Ltd.

(57) ABSTRACT

A control method for a power tool for rotary tools comprises rotating a tool holder continuously about a working axis by a rotary drive. A rotary movement of a handle about the working axis is sensed by a motion sensor. A first angle of rotation of the handle is estimated by a first motion estimator, wherein rotary movements beneath a limit value are discounted. A second angle of rotation of the handle is estimated by a second motion estimator, wherein rotary movements beneath the limit value are taken into account. A measure for reducing the torque output of the rotary drive is activated when the first angle of rotation exceeds a first triggering threshold (A1), and when the second angle of rotation exceeds a second triggering threshold (A2) and at the same time a power output of the rotary drive exceeds a power threshold (L).

20 Claims, 2 Drawing Sheets

(51) Int. Cl.
    *B25F 5/00*     (2006.01)
    *B23Q 11/04*     (2006.01)

(52) U.S. Cl.
    CPC ........... *B25D 16/00* (2013.01); *B25D 16/003* (2013.01); *B25F 5/00* (2013.01); *B25D 2250/195* (2013.01); *B25D 2250/221* (2013.01); *B25D 2250/265* (2013.01)

(58) Field of Classification Search
    CPC ........ B25D 2250/195; B25D 2250/265; B25D 2250/221; B25F 5/00
    USPC ............. 173/1–2, 4–8, 11, 18, 29, 170, 176, 173/180–181
    See application file for complete search history.

(56) References Cited

U.S. PATENT DOCUMENTS

| | | | | |
|---|---|---|---|---|
| 4,754,669 | A * | 7/1988 | Verdier | B25B 21/00 81/57.14 |
| 5,563,482 | A * | 10/1996 | Shaw | B23P 19/066 173/176 |
| 5,584,619 | A | 12/1996 | Guzzella | |
| 5,996,707 | A * | 12/1999 | Thome | B25F 5/00 173/171 |
| 6,111,515 | A * | 8/2000 | Schaer | B25F 5/00 340/679 |
| 6,415,875 | B1 * | 7/2002 | Meixner | B24B 23/028 173/171 |
| 6,799,643 | B2 * | 10/2004 | Voulkidis | B25D 11/00 173/11 |
| 6,968,908 | B2 * | 11/2005 | Tokunaga | B25B 21/02 173/181 |
| 7,882,899 | B2 * | 2/2011 | Borinato | B23B 45/008 173/176 |
| 7,900,715 | B2 * | 3/2011 | Chen | B23B 45/008 173/176 |
| 7,938,194 | B2 * | 5/2011 | Carrier | B25F 5/00 173/176 |
| 8,286,723 | B2 * | 10/2012 | Puzio | B25B 23/0064 173/1 |
| 8,561,715 | B2 * | 10/2013 | Gut | B25F 5/001 173/1 |
| 9,878,427 | B2 * | 1/2018 | Fuchs | B25B 21/00 |
| 2003/0116332 | A1 * | 6/2003 | Nadig | B25D 16/003 173/48 |
| 2004/0011632 | A1 | 1/2004 | Hellmann et al. | |
| 2005/0050720 | A1 * | 3/2005 | Asano | B23P 19/02 29/714 |
| 2006/0081386 | A1 * | 4/2006 | Zhang | B23D 59/001 173/2 |
| 2007/0008162 | A1 | 1/2007 | Gossett et al. | |
| 2007/0084613 | A1 | 4/2007 | Zhang et al. | |
| 2010/0071920 | A1 * | 3/2010 | Lau | B25F 5/00 173/1 |
| 2011/0079407 | A1 * | 4/2011 | Iimura | B25B 23/1475 173/2 |
| 2011/0114345 | A1 * | 5/2011 | Schlesak | B23Q 11/0092 173/1 |
| 2012/0090863 | A1 * | 4/2012 | Puzio | B25F 5/02 173/2 |
| 2013/0126202 | A1 * | 5/2013 | Oomori | B25B 21/00 173/217 |
| 2013/0140050 | A1 * | 6/2013 | Eshleman | B25B 21/00 173/1 |
| 2013/0189901 | A1 * | 7/2013 | Klee | B23Q 11/0085 451/1 |
| 2013/0224677 | A1 * | 8/2013 | Yamashita | A61C 19/042 433/27 |
| 2014/0053419 | A1 | 2/2014 | Leh et al. | |
| 2014/0166323 | A1 | 6/2014 | Cooper | |
| 2014/0196920 | A1 * | 7/2014 | Wirnitzer | B25F 5/00 173/1 |
| 2014/0321930 | A1 * | 10/2014 | Dengler | B23B 45/02 408/8 |
| 2014/0352995 | A1 * | 12/2014 | Matsunaga | B25F 5/00 173/179 |
| 2016/0215475 | A1 * | 7/2016 | Meguriya | E02F 3/32 |
| 2016/0279776 | A1 * | 9/2016 | Wirnitzer | B25F 5/00 |
| 2016/0354911 | A1 * | 12/2016 | Aoki | B25F 5/00 |
| 2017/0008156 | A1 * | 1/2017 | Miyazaki | B25B 23/1475 |
| 2018/0339385 | A1 * | 11/2018 | Yamamoto | B25F 5/026 |

\* cited by examiner

PORTABLE POWER TOOL

CROSS-REFERENCE TO RELATED APPLICATIONS

This patent application is the U.S. National Stage of International Patent Application No. PCT/EP2017/051364, filed Jan. 24, 2017, which claims the benefit of European Patent Application No. 16153432.6, filed Jan. 29, 2016, which are each incorporated by reference.

FIELD BACKGROUND OF THE INVENTION

The present invention relates to a hand-held power tool as known from EP 0666148 B1.

When working with a drill hammer, the drill bit may jam in the masonry. The reactive torque causes the drill hammer to twist against the holding force by the user. If the drill bit jams suddenly, the user is caught off guard and may be injured due to the high torque that occurs. A rotation of the drill hammer or its handle is therefore associated with a potentially hazardous situation, and the drill hammer is switched off. However, the user also intentionally turns the drill hammer during operation, for example for a more comfortable holding position. In this case, the drill hammer must not be switched off.

DISCLOSURE BRIEF SUMMARY OF THE INVENTION

A control method according to the invention for a power tool for rotary tools provides the following steps. A tool holder is continuously rotated about a working axis by means of a rotary drive in response to an actuation of an operating button. A rotary movement of a handle about the working axis is detected by means of a motion sensor. A first rotational angle (28) of the handle is estimated by means of a first motion estimator, wherein slow rotary movements below a limit value are masked out. A second rotational angle (32) of the handle is estimated by means of a second motion estimator, wherein slow rotary movements below the limit value are taken into account. A protective measure for reducing the torque output of the rotary drive is activated when the first rotational angle exceeds a first trigger threshold A1. The protective measure for reducing the torque output of the rotary drive is activated when the second rotational angle exceeds a second trigger threshold A2, and at the same time a power output of the rotary drive exceeds a power threshold L.

The control method switches on the protective measure in the event of rapid, uncontrollable rotary movements. For rotary movements that may possibly take place in a controlled manner, the control method checks the power consumption or its equivalent, the applied torque, as a dual criterion. The power consumption is suitable as a distinguishing criterion as an indication of an uncontrolled, slow rotary movement.

One embodiment provides that the limit value is in the range between 10 degrees/s and 50 degrees/s.

One particular embodiment provides that the estimation of a first rotational angle (28) of the handle by means of the first motion estimator masks out slow rotary movements below a first limit value, and the estimation of a second rotational angle (32) of the handle by means of the second motion estimator takes into account slow rotary movements below a second limit value, wherein the second limit value is less than 10% of the first limit value. The two limit values are preferably greatly different.

The first motion estimator may be implemented by a band-limited integrator having a first limiting frequency w1, and the second motion estimator may be implemented by a band-limited integrator having a second limiting frequency w2. The first limiting frequency w1 is at least ten times higher than the second limiting frequency w2.

The first trigger threshold A1 may be lower than the second trigger threshold A2. For rapid rotary movements, preferably only small rotational angles are allowed, since there is a higher risk of injury with rapid rotary movements. The slow rotary movements may be intended, so that an intervention that is as late as possible is of interest.

The control method according to claim 5, characterized in that the first trigger threshold A1 is less than 50 degrees and the second trigger threshold A2 is greater than 90 degrees.

BRIEF DESCRIPTION OF THE SEVERAL VIEWS OF THE DRAWINGS

The following description explains the invention with reference to exemplary embodiments and the figures, which show the following.

Unless stated otherwise, identical or functionally equivalent elements are indicated by the same reference numerals in the figures.

DETAILED DESCRIPTION OF THE INVENTION

Figure 1:
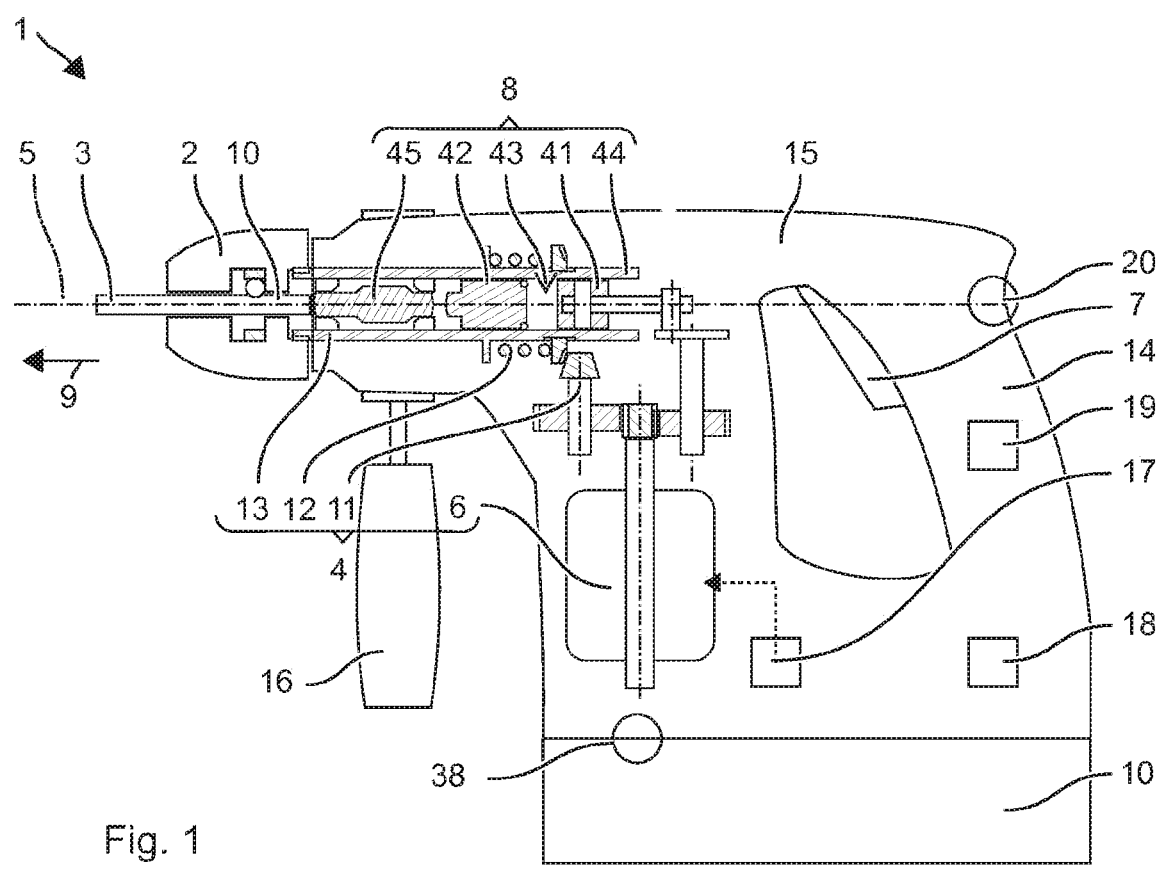
FIG. 1 shows a drill hammer.
Figure 2:
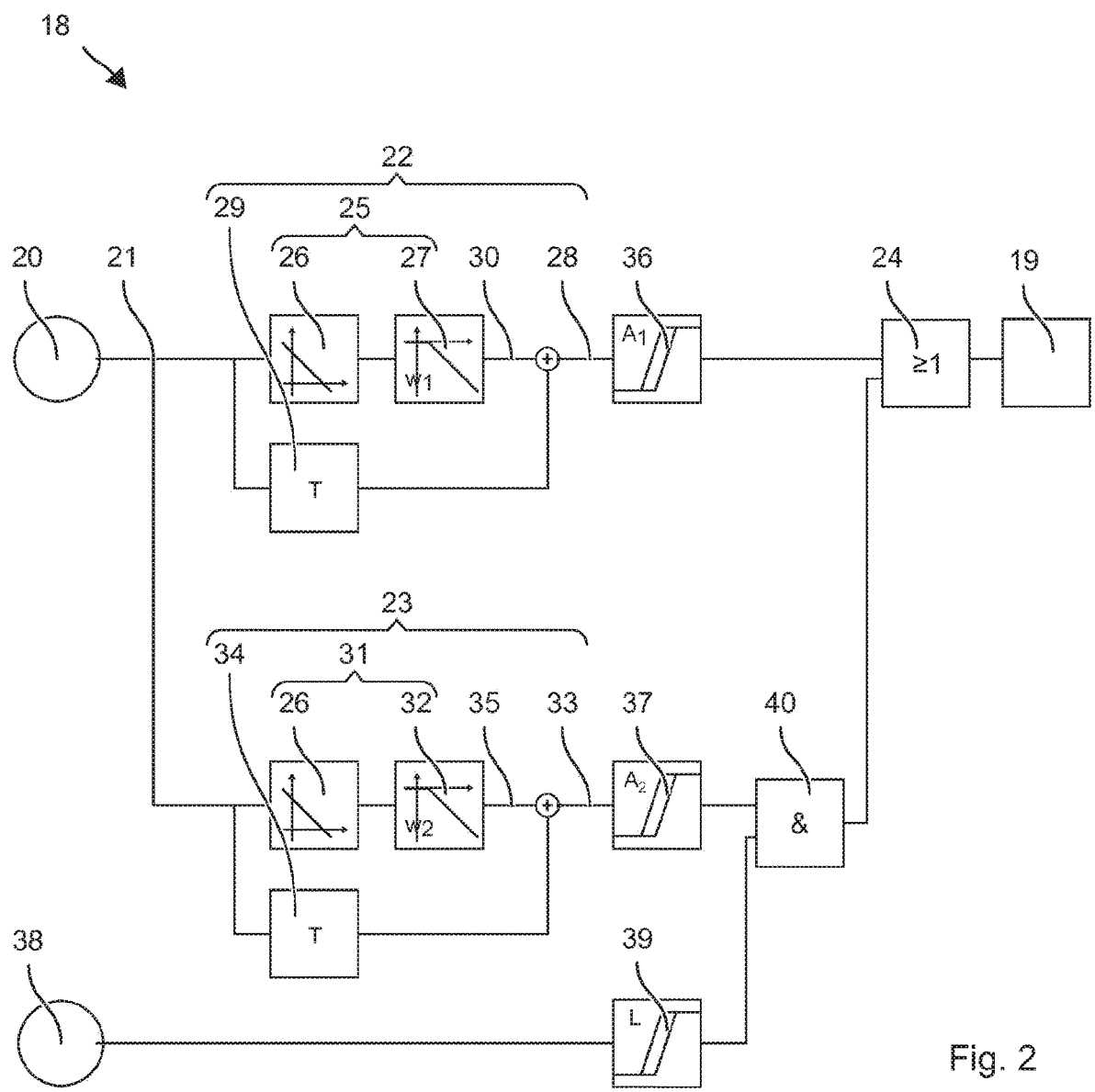
FIG. 2 shows a protective device.

FIG. 1 schematically shows a drill hammer 1 as an example of a hand-guided power tool. The drill hammer 1 has a tool holder 2 in which a drill bit 3 or some other tool may be inserted and locked. The drill hammer 1 by way of example has a rotary drive 4 which rotationally drives the tool holder 2 about its working axis 5. The rotary drive 4 is based on an electric motor 6 which the user may switch on and off via an operating button 7. An additional striking mechanism 8 may periodically strike the drill bit 3 in a striking direction 9 along the working axis 5. The striking mechanism 8 is preferably driven by the same electric motor 6. A power supply may be provided by a battery 10 or a power line.

The rotary drive 4 encompasses the electric motor 6. The electric motor 6 is coupled to the tool holder 2 via a drive train. The drive train has a reduction gear 11, for example. In addition, a clutch 12 may be provided. A shaft 13, for example a hollow shaft, couples the rotary drive 4 to the tool holder 2.

The drill hammer 1 has a handle 14 which typically is fastened at an end of a machine housing 15 of the drill hammer 1 facing away from the tool holder 2. An additional handle 16 may be fastened, for example, near the tool holder 2. The user may guide and hold the drill hammer 1 with the handle 14 during the drilling.

The user may switch the rotary drive 4 on and off with the operating button 7. The operating button 7 by way of example has a deactivating switch position and one or more activating switch positions. The operating button 7 is preferably monostable in the deactivating switch position. The user must keep the operating button 7 pressed down; otherwise, the rotary drive 4 is switched off. The user, for example by choosing his/her activating force, may select one of the activating switch positions. The various switch positions may be associated with different rotational speeds or a different torque of the rotary drive 4.

A motor controller 17 is awakened when the operating button 7 is actuated. The motor controller 17 controls the rotational direction of the electric motor 6. The motor controller 17 feeds a current in phase into the windings of the electric motor 6, corresponding to the forward direction. The forward direction for a drill hammer 1 is unalterably specified as clockwise rotation. For an electric screwdriver, the forward direction for operation is typically settable by a selector switch.

The motor controller 17 controls the rotational speed of the electric motor 6. The motor controller 17 controls the power consumption of the electric motor 6 to a setpoint value, resulting in a rotational speed that is specified by the load. The motor controller 17 specifies, for example, an average current by means of a pulse width modulation. The motor controller 17 may adjust the power consumption in such a way that a constant rotational speed results. The limitation of the power consumption or the rotational speed may be specified, for example, by the user and the intensity of actuation of the operating button 7.

The rotary drive 4 typically rotates in the clockwise direction in response to the actuation of the operating button 7. The clockwise rotational direction has become established as the standard for drilling and for setting screws. During the drilling, a small reactive torque which results from the resistance of rock to the rotating drill bit 3 typically acts on the user. The user may apply the necessary holding force with no effort or with slight exertion. The drill bit 3 may become blocked in the borehole, resulting in the action of a high torque on the tool holder 2 due to the rotary drive 4 which continues to rotate. The reactive torque may increase abruptly, and as a result may injure the user and damage the drill hammer 1. To prevent injury to the user and damage to the drill hammer 1, a protective device 18 monitors the behavior of the drill hammer 1, and in the event of an expected or occurring blockage initiates a protective measure 19 which interrupts the operation of the drill hammer 1 specified by the operating button 7.

The protective device 18 includes a motion sensor 20. The motion sensor 20 is preferably situated on the working axis 5. The motion sensor 20 may be situated, for example, on or near the handle 16. The motion sensor 20 detects a rotary movement of the handle 14 about the working axis 5. One example of a motion sensor 20 is a gyro sensor, which directly determines an angular velocity based on a Coriolis force exerted by the rotary movement. The gyro sensor may contain an oscillating plate, example, whose oscillation frequency is altered by the Coriolis force. An alternative motion sensor 20 detects an acceleration at two offset locations in the drill hammer 1, and based on the difference determines the rotary movement of the drill hammer 1.

An output signal 21 of the motion sensor 20 is a measure for the rotational speed w or angular velocity of the handle 14 about the working axis 5. The output signal 21 is supplied to a first motion estimator 22 for rapid rotary movements, and to a second motion estimator 23 for slow rotary movements. The protective measure 19 may be triggered independently of the first motion estimator 22 and of the second motion estimator 23, as symbolically illustrated by the logical OR gate 24.

The first motion estimator 22 includes a (first) band-limited integrator 25. The band-limited integrator 25 has a (first) limiting frequency w1 in the range between 300 mHz and 1000 mHz. The low limiting frequency w1 suppresses slow rotary movements of the handle 14, which are typically initiated by the user. Rapid rotary movements, which typically are not initiated by a user, but, rather, indicate a blockage of the drill bit 3, are integrated. Angular velocities of the handle 14 in the range of the rotational speed of the tool holder are typically caused by a blockage. The typical rotational speeds are in the range between 2 Hz and 20 Hz, and the angular velocities, considered to be associated with a blockage, are in the range of 500 degrees/s to 5000 degrees/s, for example.

The band-limited integrator 25 is symbolically illustrated by an unlimited integrator 26 and a high-pass filter 27. The limiting frequency w1 of the high-pass filter 27 corresponds to the limiting frequency w1 of the band-limited integrator 25. The limiting frequency w1 refers to the frequency at which the output signal 21 of the high-pass filter 27 is attenuated by 3 dB. The band-limited integrator 25 may be implemented with a digital or analog design. The output signal 21 of the motion sensor 20 is optionally scanned in a time-discrete manner. A digital integrator 25 may be implemented by means of discrete circuit or as a routine in a microprocessor.

The (first) output signal 28 of the first motion estimator 22 is an estimate of the rotational angle by which the drill hammer 1 or the handle 16 has rotated within a brief prior time period. The limiting frequency w1 limits the observed time period, or weights rotary movements outside the time period with very small factors.

The first motion estimator 22 by way of example has an additional proportional component 29 that multiples the instantaneous angular velocity by a fixed time constant T. The proportional component 29 is used to estimate the extent of further rotation of the handle 16 during a future time period. The proportional component 29 and the output signal 30 of the band-limited integrator 25 are added to the output signal 28 of the first motion estimator 22.

The second motion estimator 23 includes a (second) band-limited integrator 31. The design of the second band-limited integrator 31 is identical to the design of the first band-limited integrator 25. A (second) limiting frequency w2 of the integrator 31 is selected in such a way that the second motion estimator 23 integrates rotary movements having a lower angular velocity of 20 degrees/s. The second limiting frequency w2 is preferably at most $\frac{1}{10}$, preferably at most $\frac{1}{100}$, of the first limiting frequency w1. The second limiting frequency w2 is preferably in the range between 2 mHz and 10 mHz. The gain of the first band-limited integrator 25 and of the second band-limited integrator 31 above the second limiting frequency w2 is preferably the same. A limiting frequency w2 of the high-pass filter 32 corresponds to the second limiting frequency w2.

The (second) output signal 33 of the second motion estimator 23 into an estimate of the rotational angle by which the drill hammer 1 or the handle 16 has rotated about the working axis 5. The second motion estimator 23 also takes into account slow rotary movements. In this way, significant consideration is given to rotary movements even further in the past.

The second motion estimator 23 may likewise have a proportional component 34, which is preferably identical to the proportional component 29 of the first motion estimator 22, in particular having the same time constant T. The output signal 33 of the second motion estimator 23 is based on the sum of the output signal 35 of the second band-limited integrator 31 and the proportional component 34.

The protective device 18 has a first trigger threshold A1 which is implemented by a (first) discriminator 36, for example, and to which the output signal 28 of the first motion estimator 22 is compared. If the output signal 28 exceeds the trigger threshold A1, the protective measure 19 is initiated. The first trigger threshold A1 corresponds to a rotational angle of at most 50 degrees, preferably at least 10 degrees. The protective device 18 is activated when the first motion estimator 22 has detected an average rotation of greater than 50 degrees, or expects a rotation of greater than 50 degrees within the time period.

The protective device 18 has a second trigger threshold A2 which is implemented by a (second) discriminator 37, for example, and to which the second output signal 33 of the second motion estimator 23 is compared. The second trigger threshold A2 corresponds to a rotational angle between 90 degrees and 120 degrees. The second trigger threshold A2 is greater than the first trigger threshold. The rotation of the handle 14 takes place with an angular velocity that allows a response by the user. The time period within which the handle 16 is rotated by a rotational angle of 50 degrees is longer than the typical human reaction time of 200 ms to 400 ms.

The exceedance of the second trigger threshold A2 is only one condition for initiating the protective measure 19. The second condition is the exceedance of a power threshold by the power output of the rotary drive 4.

The power output is detected by a power sensor 38. The power output may be determined, for example, indirectly via the power consumption of the electric motor 6. In addition, the power output may be determined based on the torque exerted by the rotary drive 4 and its rotational speed. The power threshold L is above 200 watts, for example. A discriminator 39 compares the instantaneous power output to the power threshold L. The protective measure 19 is triggered when both the first condition and the second condition are met, which is symbolically illustrated by the AND gate 40.

The protective measure 19 may encompass a mechanical interruption of the rotary drive 4 by means of the clutch 12. The clutch 12 is appropriately engageable via an actuator, for example a solenoid. Alternatively or additionally, the electric motor 6 may be braked. The braking of an electric motor 6 takes place, for example, by short-circuiting the rotor windings or short-circuiting the stator windings via a load resistance. The braking of the electric motor 6 may be controlled by a motor controller 17.

The striking mechanism 8 is a pneumatic striking mechanism, for example. An exciter piston 41 is forced by the electric motor 6 into a periodic back-and-forth movement along the working axis 5. A striker 42 that runs on the working axis 5 is coupled to the exciter piston 41 via an air spring. The air spring is formed by a pneumatic chamber 43 that is closed off by the exciter piston 41 and the striker 42. The exciter piston 41 and the striker 42 may be guided in a guide tube 44 which at the same time closes off the pneumatic chamber 43 in the radial direction. A snap die 45 may be situated from the striker 42 in the striking direction 9. The striker 42 strikes the snap die 45, which further transmits the impact to the drill bit 3 situated in the tool holder 2.

The invention claimed is:

1. A control method for a power tool for rotary tools, wherein the power tool has a handle, the method comprising:
continuously rotating a tool holder about a working axis by a rotary drive in response to an actuation of an operating button;
detecting a rotary movement of the handle about the working axis by a motion sensor;
estimating a first rotational angle of the handle by a first motion estimator which masks out slow rotary movements below a limit value;
estimating a second rotational angle of the handle by a second motion estimator which takes into account slow rotary movements below the limit value;
activating a protective measure for reducing torque output of the rotary drive when the first rotational angle exceeds a first trigger threshold;
activating the protective measure for reducing the torque output of the rotary drive when the second rotational angle exceeds a second trigger threshold, and at the same time a power output of the rotary drive exceeds a power threshold.

2. The control method according to claim 1, wherein the limit value is in the range between 10 degrees and 50 degrees.

3. The control method according to claim 1, wherein the estimation of a first rotational angle of the handle by the first motion estimator masks out slow rotary movements below a first limit value, and the estimation of a second rotational angle of the handle by the second motion estimator takes into account slow rotary movements below a second limit value, wherein the second limit value is less than 10% of the first limit value.

4. The control method according to claim 1, wherein the first motion estimator includes a band-limited integrator having a first limiting frequency (w1), and the second motion estimator includes a band-limited integrator having a second limiting frequency (w2), wherein the first limiting frequency is at least ten times higher than the second limiting frequency (w2).

5. The control method according to claim 1, wherein the first trigger threshold (A1) is lower than the second trigger threshold (A2).

6. The control method according to claim 5, wherein the first trigger threshold (A1) is less than 50 degrees and the second trigger threshold (A2) is greater than 90 degrees.

7. The control method according to claim 2, wherein the estimation of a first rotational angle of the handle by the first motion estimator masks out slow rotary movements below a first limit value, and the estimation of a second rotational angle of the handle by the second motion estimator takes into account slow rotary movements below a second limit value, wherein the second limit value is less than 10% of the first limit value.

8. The control method according to claim 2, wherein the first motion estimator includes a band-limited integrator having a first limiting frequency (w1), and the second motion estimator includes a band-limited integrator having a second limiting frequency (w2), wherein the first limiting frequency is at least ten times higher than the second limiting frequency (w2).

9. The control method according to claim 3, wherein the first motion estimator includes a band-limited integrator having a first limiting frequency (w1), and the second motion estimator includes a band-limited integrator having a second limiting frequency (w2), wherein the first limiting frequency is at least ten times higher than the second limiting frequency (w2).

10. The control method according to claim 7, wherein the first motion estimator includes a band-limited integrator having a first limiting frequency (w1), and the second motion estimator includes a band-limited integrator having a second limiting frequency (w2), wherein the first limiting frequency is at least ten times higher than the second limiting frequency (w2).

11. The control method according to claim 2, wherein the first trigger threshold (A1) is lower than the second trigger threshold (A2).

12. The control method according to claim 3, wherein the first trigger threshold (A1) is lower than the second trigger threshold (A2).

13. The control method according to claim 4, wherein the first trigger threshold (A1) is lower than the second trigger threshold (A2).

14. The control method according to claim 7, wherein the first trigger threshold (A1) is lower than the second trigger threshold (A2).

15. The control method according to claim 8, wherein the first trigger threshold (A1) is lower than the second trigger threshold (A2).

16. The control method according to claim 9, wherein the first trigger threshold (A1) is lower than the second trigger threshold (A2).

17. The control method according to claim 10, wherein the first trigger threshold (A1) is lower than the second trigger threshold (A2).

18. The control method according to claim 11, wherein the first trigger threshold (A1) is less than 50 degrees and the second trigger threshold (A2) is greater than 90 degrees.

19. The control method according to claim 12, wherein the first trigger threshold (A1) is less than 50 degrees and the second trigger threshold (A2) is greater than 90 degrees.

20. The control method according to claim 13, wherein the first trigger threshold (A1) is less than 50 degrees and the second trigger threshold (A2) is greater than 90 degrees.

* * * * *